United States Patent
Arai et al.

(10) Patent No.: US 7,597,068 B2
(45) Date of Patent: Oct. 6, 2009

(54) INTERNAL COMBUSTION ENGINE WITH FUEL REFORMING APPARATUS

(75) Inventors: Kaori Arai, Yokohama (JP); Masaaki Kubo, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 62 days.

(21) Appl. No.: 11/711,848

(22) Filed: Feb. 28, 2007

(65) Prior Publication Data

US 2007/0204813 A1    Sep. 6, 2007

(30) Foreign Application Priority Data

Mar. 1, 2006    (JP) .............................. 2006-054391

(51) Int. Cl.
*F02B 43/08*    (2006.01)
*F02B 13/00*    (2006.01)

(52) U.S. Cl. .......................................... 123/3; 123/575
(58) Field of Classification Search .................. 123/1 A, 123/2, 575–578, 3
See application file for complete search history.

(56) References Cited

U.S. PATENT DOCUMENTS

| 4,210,103 | A * | 7/1980 | Dimitroff et al. ............. 123/1 A |
| 4,656,831 | A * | 4/1987 | Budininkas et al. ........... 60/297 |
| 6,508,210 | B2 * | 1/2003 | Knowlton et al. ............... 123/3 |
| 6,804,949 | B2 * | 10/2004 | Andrews et al. ............... 60/272 |
| 7,302,795 | B2 * | 12/2007 | Vetrovec ....................... 60/309 |
| 7,434,547 | B2 * | 10/2008 | Clawson ......................... 123/3 |
| 2003/0168024 | A1 * | 9/2003 | Qian et al. ..................... 123/3 |

FOREIGN PATENT DOCUMENTS

| JP | 58-35258 | 3/1983 |
| JP | 58096155 A * | 6/1983 |
| WO | WO 171838 A2 * | 9/2001 |

* cited by examiner

*Primary Examiner*—Noah Kamen
(74) *Attorney, Agent, or Firm*—Drinker Biddle & Reath LLP

(57) ABSTRACT

A heat engine system includes a fuel reforming system for supplying a reformed gas to be combusted in an internal combustion engine or used to generate electricity in a fuel cell. An alcohol-containing fuel and water are mixed in a tank and separated into a hydrocarbon based fuel and the fluid mixture of alcohol and water. A reformer uses an endothermic reaction, such as a water vapor reforming process, to obtain the reformed gas from the fluid mixture.

17 Claims, 4 Drawing Sheets

INTERNAL COMBUSTION ENGINE WITH FUEL REFORMING APPARATUS

CROSS-REFERENCE TO RELATED APPLICATIONS

This application claims priority under 35 U.S.C. § 119 to Japanese Patent Application No. 2006-054391, filed on Mar. 1, 2006, the disclosure of which is incorporated by reference herein in its entirety.

BACKGROUND OF THE INVENTION

1. Field of the Invention

The present invention relates to a technique for separating an alcohol-containing fuel, i.e., a hydrocarbon based fuel in which an alcohol component is partly mixed, into the alcohol component and the hydrocarbon based fuel. Thus, a reformed gas may be obtained and used as a fuel for a heat engine, such as an internal combustion engine.

2. Description of Related Art

According to a related method, an alcohol-containing fuel is separated by distillation into alcohol and gasoline. However, separation according to the related method requires a distilling device that requires a separate heating device. This results in significant increases in the cost and size of the separation system. Accordingly, it has been difficult to use the fuel obtained by the related method as a fuel for an internal combustion engine, and in particular as fuel for an internal combustion engine of a vehicle.

BRIEF SUMMARY OF THE INVENTION

The present invention relates to overcoming the disadvantages of the related art. In this regard, there is provided an internal combustion engine with an extremely simple and compact fuel reforming apparatus. The fuel reforming apparatus is capable of separating an alcohol-containing fuel, i.e., a hydrocarbon based fuel in which an alcohol component is partly mixed, into the alcohol component and the hydrocarbon based fuel, and obtaining a reformed gas.

In accordance with an aspect of an embodiment of the invention, there is provided a fuel reforming apparatus that includes a water supply means for supplying water to an alcohol-containing fuel, e.g., a hydrocarbon based fuel (other than alcohol) in which an alcohol component is partly mixed; formation means for forming, from the alcohol-containing fuel that is supplied with water, two types of fluids, e.g., a hydrocarbon based fuel and a mixture of water and alcohol; separation means for separating from each other the two types of fluids formed by the formation means; and reforming means for reforming into a gas the mixture of water and alcohol separated by the separation means. According to a further aspect of an embodiment of the invention, an engine and/or a fuel cell system may include the fuel reforming apparatus.

In accordance with another aspect of an embodiment of the invention, there is provided an extremely simple and compact fuel reforming system for supplying a reformed gas to an internal combustion engine or a fuel cell system. According to a further aspect of an embodiment of the invention, the reformed gas may be combusted in the internal combustion engine or used for generating electricity in the fuel cell system, thereby significantly enhancing the fuel consumption rate of the internal combustion engine or the fuel cell system.

In accordance with yet another aspect of an embodiment of the invention, there is provided a heat engine system that includes a fuel reforming apparatus. The fuel reforming apparatus includes a first reservoir that is adapted to store water, a second reservoir that is adapted to store alcohol-containing fuel, a tank that is coupled in fluid communication with the first and second reservoirs, and a reaction vessel. The alcohol-containing fuel includes alcohol that is mixed in a hydrocarbon based fuel that is not alcohol. The tank is adapted to perform mixing and separating. The tank mixes water that is received from the first reservoir with alcohol-containing fuel that is received from the second reservoir. The mixing forms a first supply of a fluid mixture and forms a second supply of the hydrocarbon based fuel. The fluid mixture includes water and alcohol. The tank separates the first supply of the fluid mixture from the second supply of the hydrocarbon based fuel. The reaction vessel is coupled in fluid communication with the first supply and is adapted to reform the fluid mixture, which is received from the tank, so as to form a reformed gas.

In accordance with still another aspect of an embodiment of the invention, there is provided a method of operating a heat engine system. The method includes mixing water with alcohol-containing fuel so as to form a first supply of a fluid mixture and a second supply of a hydrocarbon based fuel that is not alcohol, separating the first and second supplies, and reforming the fluid mixture to form a reformed gas. The alcohol-containing fuel includes alcohol mixed with the hydrocarbon based fuel, and the fluid mixture includes water and alcohol.

In accordance with yet another aspect of an embodiment of the invention, there is provided a heat engine system that includes a mixing and separating means for forming water and alcohol-containing fuel as a fluid mixture and a hydrocarbon based fuel that is not alcohol, and a reforming means for reforming the fluid mixture as a reformed gas. The alcohol-containing fuel includes alcohol mixed with the hydrocarbon based fuel, and the fluid mixture includes water and alcohol.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Figure 1:
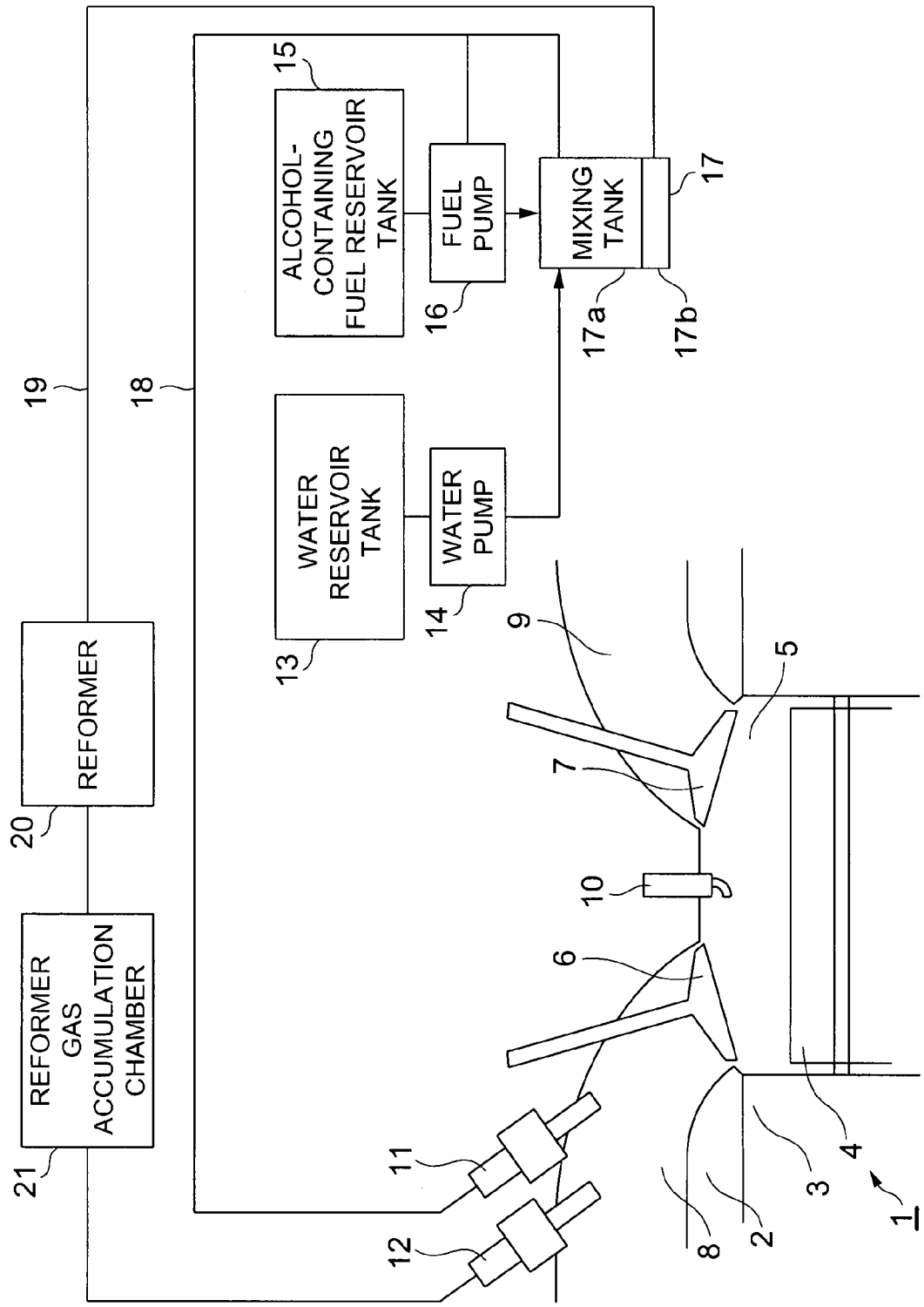
FIG. 1 is a schematic diagram of a first embodiment according to the present invention.

Referring to a first embodiment shown in FIG. 1, a heat engine system may include an internal combustion engine 1, which preferably includes a cylinder head 2, a cylinder block 3, and a piston 4, which together define a combustion chamber 5. An intake valve 6 and an exhaust valve 7 separate an intake port 8 and an exhaust port 9, respectively, from combustion chamber 5. The intake valve 6 opens to allow ingress of fresh combustion components into the combustion chamber 5, and the exhaust valve 7 opens to allow egress of spent combustion products from the combustion chamber 5. Closing the intake and exhaust valves 6, 7 allows compression of the combustion components and allows expansion of the combustion products.

A spark or ignition plug 10 is preferably disposed substantially near the center of an upper section of combustion chamber 5. A main fuel injection valve 11 and a reformed gas injection valve 12 are disposed in intake port 8, and will be further described hereinafter.

The heat engine system preferably also includes a fuel reforming apparatus that includes a reservoir tank 13, which stores water, and a water pump 14 coupled to a lower end section of reservoir tank 13 to supply water under pressure to a mixing tank 17, which will be further described hereinafter. Thus, reservoir tank 13 and water pump 14 may provide a water supply means. The fuel reforming apparatus also includes fuel tank 15, which stores an alcohol-containing fuel, e.g., a hydrocarbon based fuel in which an alcohol component is partly mixed. Although hydrocarbon based fuels generally include alcohols, as it is used herein the term "hydrocarbon based fuel" excludes alcohols per se. That is to say, the hydrocarbon based fuel referred to herein is considered to be a hydrocarbon based fuel other than an alcohol. Gasoline is an example of such a hydrocarbon based fuel. Ethanol is an example of an alcohol, and it is believed that reformed bioethanol, e.g., made from sugarcane or the like, may supply sufficient energy. A fuel pump 16 is coupled to a lower end section of fuel tank 15, to supply the alcohol-containing fuel under pressure to mixing tank 17. Thus, fuel tank 15 and fuel pump 16 may provide an alcohol-containing fuel supply means.

Mixing tank 17 mixes the water supplied from water pump 14 and the alcohol-containing fuel supplied from fuel pump 16, and separately forms two types of fluids: (1) a hydrocarbon based fuel (other than alcohol), and (2) a fluid mixture of alcohol and water.

The mixing and separating processes will now be described in detail. The water and alcohol-containing fuel are supplied to and stirred in mixing tank 17. As a result of the affinity between alcohol and water being greater than the affinity between alcohol and the hydrocarbon based fuel, the alcohol unites with the water to form the fluid mixture of alcohol and water, which separates from the remaining hydrocarbon based fuel (e.g., gasoline, etc.) that previously contained the alcohol.

The quantity of water supplied to mixing tank 17 is preferably 5% or lower with respect to the quantity of the alcohol-containing fuel that is also supplied to mixing tank 17. In general, the amount of water that is added should be sufficient to unite the water and the alcohol. The specific gravity of the fluid mixture is higher than that of the hydrocarbon based fuel. Accordingly, after stirring and mixing in the mixing tank 17, gravity causes separation such that the hydrocarbon based fuel occupies a relatively upper part 17a of mixing tank 17, and the fluid mixture occupies a relatively lower part 17b of mixing tank 17.

Since the hydrocarbon based fuel and the fluid mixture are thus separated in the upper and lower parts of mixing tank 17, the hydrocarbon based fuel may be drawn through a hydrocarbon based fuel tube 18 connected to relatively upper part 17a of mixing tank 17, and the fluid mixture may be drawn through a fluid mixture tube 19 connected to relatively lower part 17b of mixing tank 17. Alternatively, the hydrocarbon based fuel and the fluid mixture may be separated from each other by centrifugal force, e.g., due to rotation of mixing tank 17 or by allowing the fluids within mixing tank 17 to pass through particular fluid passages during rotation.

Mixing tank 17 provides a two fuel type formation means that separately forms the hydrocarbon based fuel and the fluid mixture of water and alcohol. Thus, mixing tank 17, hydrocarbon based fuel tube 18, and fluid mixture tube 19 provide a two fuel type separation means.

The fluid mixture drawn through fluid mixture tube 19 is sent to a reformer 20. The reformer 20 provides a reforming means that is capable of reforming the fluid mixture into reformed gas, e.g., by a water vapor reforming process. Generally, the water vapor reforming process is an endothermic reaction such that energy, e.g., heat, must be added from a source external to the reaction. The resulting reformed gas is, for example, a fuel mixture of hydrogen and carbon monoxide or a lower hydrocarbon. Preferably, the reformed gas is pressurized and sent to a reformed gas accumulation chamber 21. Thus, it is possible to obtain the hydrocarbon based fuel and the reformed gas, i.e., two fuel types.

Hydrocarbon based fuel tube 18 is coupled to the main fuel injection valve 11, and the reformed gas accumulation chamber 21 is coupled to the reformed gas injection valve 12. An engine control unit (ECU, not shown) controls main fuel and reformed gas injection valves 11, 12 such that at least one of the hydrocarbon based fuel and the reformed gas is injected into intake port 8 so as to provide at least one combustion component to combustion chamber 5. The ECU may adjust the relative quantities of the hydrocarbon based fuel and the reformed gas in accordance with engine load and engine rotational speed. Preferably, the ECU increases the relative quantity of the reformed gas that is injected with a decreasing engine load, and decreases the relative quantity of the reformed gas that is injected with an increasing engine load. When the engine load is extremely high, e.g., such that a knocking phenomenon may occur in the engine, it is possible to avoid knocking and minimize torque fall by injecting the original alcohol-containing fuel or a fuel containing a large quantity of the separated alcohol fuel. This effect is due at least in part because the octane value of alcohol is high.

The energy required in the reformer 20 during the endothermic reaction, e.g., by the water vapor reforming process, may be provided from heat generated by internal combustion engine 1. Preferably, heat energy is provided by the high temperature exhaust gas that is produced by internal combustion engine 1 and which is generally otherwise discarded. For example, an exhaust system catalyst that is used to purify the exhaust gas from combustion chamber 5 may provide heat energy. Moreover, fuel from upstream causes oxidization of the catalyst, which is an exothermic reaction that increases the catalyst temperature and thus increases the heat energy that may be provided to the reformer 20. Balancing the endothermic and exothermic reactions preferably results in a so-called auto-thermal process with improved operating efficiency of the system as a whole. Accordingly, it is possible to provide heat energy relatively easily and efficiently using catalyst oxidation. Further, heat energy for the water vapor reforming process is also provided during engine start. Additionally, the quantity of intake air provided via intake port 8 may be controlled by a throttle (not shown), and the engine load of internal combustion engine 1 may be controlled by the quantities of the hydrocarbon based fuel and/or the reformed gas that are injected with the throttle fully opened. This significantly reduces the pumping loss of internal combustion engine 1, especially in an operation region in which the throttle is not fully opened (e.g., an operation region characterized by low engine rotational speed and low load), and thereby significantly improves the fuel efficiency of internal combustion engine 1. Moreover, the fuel reforming apparatus may have an extremely simple and compact construction and still efficiently provide at a low temperature a reformed gas containing hydrogen. Accordingly, a reformed gas may be provided irrespective of the state of combustion of internal combustion engine 1. These are especially advantageous effects for an internal combustion engine in a mobile application, e.g., a vehicle.

When the fuel oxidizing the catalyst is the main fuel, e.g., the hydrocarbon based fuel, then the heat required by the water vapor reforming process is provided by the main fuel. Accordingly, heat for the reformer 20 may be provided irrespective of the availability of the reformed gas. The reformed gas, if available, may be used instead of, or in addition to, the main fuel, e.g., the hydrocarbon based fuel.

Figure 2:
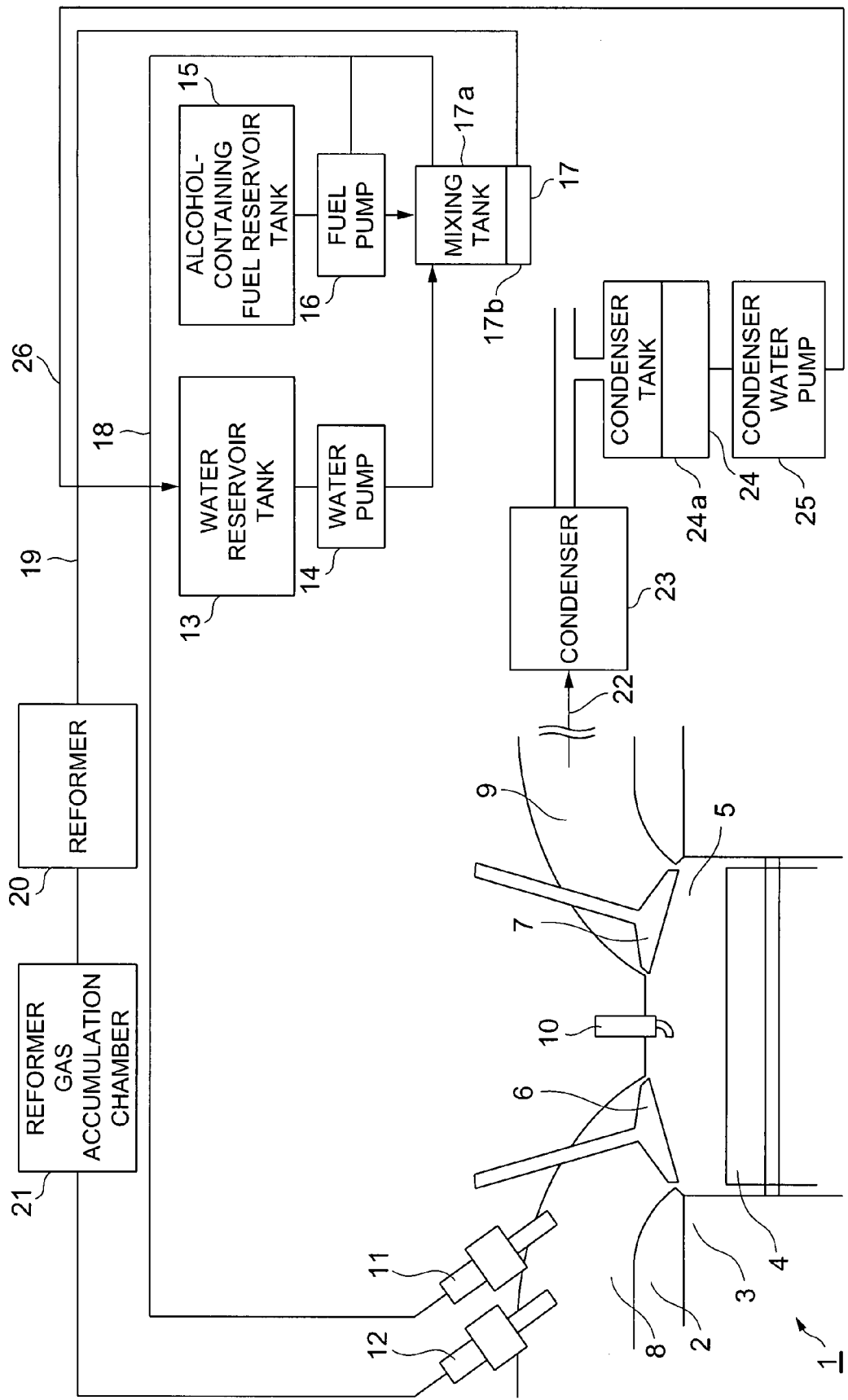
FIG. 2 is a schematic diagram of a second embodiment according to the present invention.

A second embodiment will now be described with reference to FIG. 2. Because the overall configuration of the second embodiment is generally similar to that of the first embodiment shown in FIG. 1, only differences will be explained in detail.

A condenser 23 may be provided downstream of an exhaust pipe 22. Condenser 23 cools the exhaust gas so that a water vapor part of the exhaust gas is liquefied and collected in a condensed water tank 24. Due to the influence of gravity, the condensed water is collected in a lower part 24a of condensed water tank 24, and sent under pressure by a condensed water pump 25 through a condensed water tube 26 to reservoir tank 13. Preferably, impurities in the condensed water may be removed by a filter (not shown), which provides a filter means for purifying the condensed water. Preferably, the filter may be a kind of so-called engine oil filter and may also be associated with the condensed water pump 25. When the ambient temperature surrounding the exhaust pipe 24 is low, water vapor in the exhaust gas may condense into water within the exhaust pipe without additional cooling by condenser 23. On the other hand, when the ambient temperature is high, coolant water may be circulating in the condenser 23 to liquefy the water vapor part of the exhaust gas.

Figure 3:
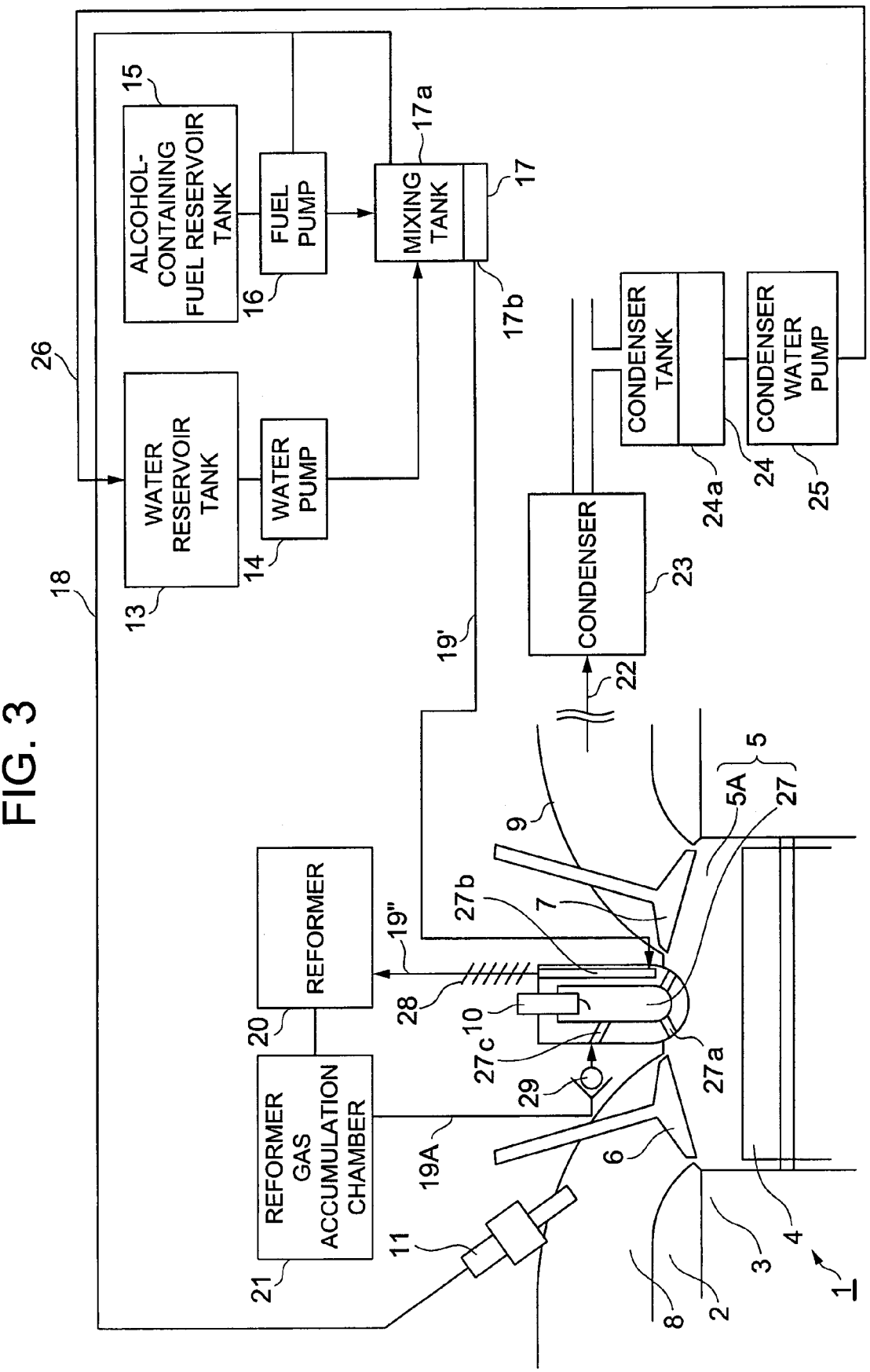
FIG. 3 is a schematic diagram of a third embodiment according to the present invention.

A third embodiment will now be described with reference to FIG. 3. Because the overall configuration of the third embodiment is generally similar to that of the first and second embodiments shown in FIGS. 1 and 2, only differences will be explained in detail.

Combustion chamber 5 includes a main portion 5A and an auxiliary chamber 27 that is preferably provided approximately in the center of an upper section of main portion 5A. The ignition plug 10 is provided in auxiliary chamber 27 to ignite combustion components in auxiliary chamber 27. Preferably, a fluid path 27a through the bottom wall of auxiliary chamber 27 directs a generally torch shaped flame of combustion gas into main portion 5A.

The fluid mixture is drawn through a fluid mixture tube 19' that connects relatively lower part 17b of mixing tank 17 to a fluid path 27b that is formed in the wall of auxiliary chamber 27. The temperature of auxiliary chamber 27, which is high due to ignition of combustion components, may provide at least part of the heat energy for the water vapor reforming process. Further, the heat energy taken by the water vapor reforming process may cool auxiliary chamber 27 so as to avoid an excessively high temperature of auxiliary chamber 27. If the temperature of the fluid mixture is not raised sufficiently for the water vapor reforming process, then a heater 28 that is disposed in a fluid mixture tube 19" downstream of fluid path 27a may reliably raise the temperature of the fluid mixture sufficiently for the water vapor reforming process. Then, as was similarly described above, the water vapor reforming process occurs in reformer 20 and the reformed gas is sent to reformed gas accumulation chamber 21. Preferably, the reformed gas that is supplied from reformed gas accumulation chamber 21 is injected into auxiliary chamber 27 via a reformed gas tube 19A, a check valve (or injection valve) 29, and a communication passage 27c, which extends through the sidewall of auxiliary chamber 27.

The addition of reformed gas to auxiliary chamber 27 may increase the combustion rate in auxiliary chamber 27 such that the generally torch shaped flame of combustion gas provided through fluid path 27a into main portion 5A facilitates complete combustion in the entirety of combustion chamber 5 within a short combustion period. Moreover, the shortened combustion period and the increased combustion rate of laminar flow of hydrogen are effective for efficiently combusting even a very lean state of combustion components in main portion 5A. Further, since the heat of the combustion products is used during reforming, only a small quantity of the fuel is required for accomplishing the reforming. Further, on a heating value basis, it is sufficient to provide an extremely small quantity of fuel in auxiliary chamber 27 with respect to the quantity of fuel supplied to main chamber 5A. Therefore, fuel containing an extremely low alcohol content, e.g., approximately 10% alcohol, is sufficient to be effective. Since the quantity of fuel to be reformed is small, the required quantity of water may be obtained by condensing the water vapor that occurs due to oxidation during combustion.

Figure 4:
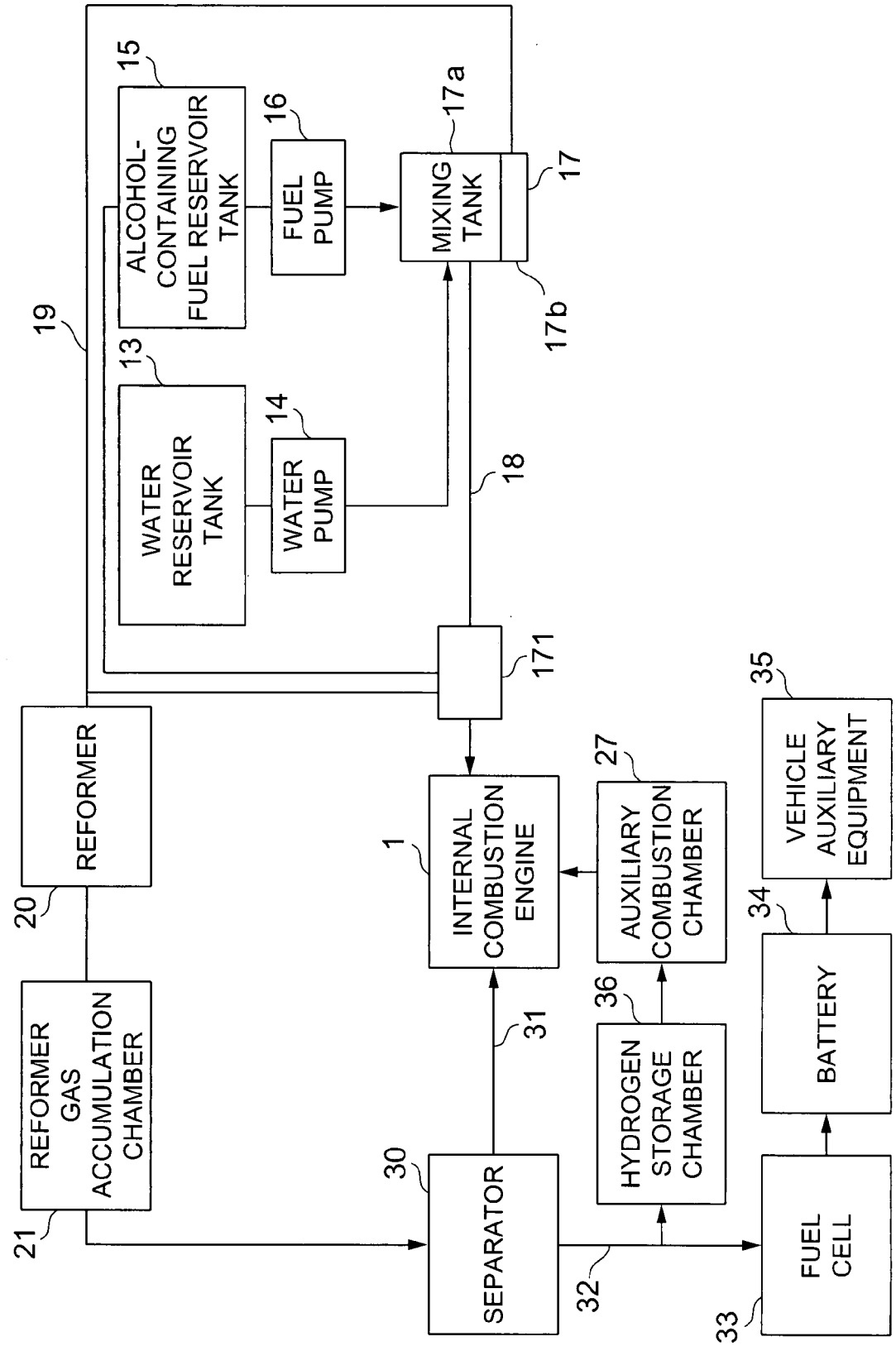
FIG. 4 is a schematic diagram of a fourth embodiment according to the present invention.

A fourth embodiment will now be described with reference to FIG. 4. Because the overall configuration of the fourth embodiment is generally similar to that of the first, second and third embodiments shown in FIGS. 1-3, only differences will be explained in detail.

Reformed gas is sent from reformed gas accumulation chamber 21 to a separator 30 that separates the reformed gas into hydrogen and other components (e.g., components capable of undergoing oxidation, such as CO). Then, the separated hydrogen is sent through a hydrogen tube 32 to one of a fuel cell 33 or a hydrogen storage chamber 36, depending on the vehicle operating conditions. In fuel cell 33 the hydrogen preferably undergoes a chemical reaction to generate electrical energy. The generated energy may be stored in a battery 34 that is connected to fuel cell 33, and then may be used to operate vehicle auxiliary equipment 35.

On the other hand, the hydrogen that is stored in hydrogen storage chamber 36 may be introduced into auxiliary chamber 27. Since electricity generation is possible on-board a vehicle, it is possible to reduce the size of the battery, etc. Insofar as separator 30 may provide pure hydrogen, fuel cell 33 may be operated efficiently. The electricity generated by fuel cell 33 may be used not only for vehicle auxiliary equipment 35, but also for providing torque during acceleration, etc. That is to say, the generated electricity may also be provided to an electric motor (not shown) for propelling the vehicle. Preferably, efficiency may be maximized by using an electric motor to supply driving torque to start vehicle acceleration, and then performing auxiliary chamber combustion.

Preferably, the gas components other than the hydrogen that are separated by separator 30 pass through a reformed fuel tube 31 and enter internal combustion engine 1. Insofar as these gas components are capable of being oxidized, energy may be gained. Preferably, the separation or reforming may be stopped based on the pressure of the reformed gas in accumulation chamber 21, etc. so as to avoid subjecting reformed gas accumulation chamber 21 to an excessive load. When the separated fuel is available, it may be mixed into the alcohol-containing fuel and then injected.

In accordance with a further aspect of any of the foregoing embodiments, the reformed gas may be pressurized and accumulated in reformed gas accumulation chamber 21, and subsequently supplied in a pressurized state from reformed gas accumulation chamber 21 to combustion chamber 5 of internal combustion engine 1. Pressurizing the reformed gas is believed to facilitate its smooth supply, and to facilitate its storage in a relatively small space.

In accordance with a further aspect of the first and second embodiments, reformed gas injection valve 12 is preferably arranged for injecting the reformed gas into intake port 8 so as to reduce the pumping loss by the volume of the reformed gas.

In accordance with a further aspect of the third embodiment, main portion 5A of combustion chamber 5 has a larger volumetric capacity than auxiliary chamber 27, and reformed gas tube 19A and check valve 29 provide an induction means for inducting the reformed gas into auxiliary chamber 27 of combustion chamber 5. Accordingly, it is possible to significantly improve fuel efficiency by inducting hydrogen, or a gas containing hydrogen, into auxiliary chamber 27 and thereby expand the limit for operating the main chamber 5A in a lean state. Further, on a heating value basis, it is sufficient to provide an extremely small quantity of fuel in auxiliary chamber 27 with respect to the quantity of fuel supplied to main chamber 5A. Therefore, fuel containing an extremely low alcohol content, e.g., approximately 10% alcohol, is sufficient to be effective. Since the quantity of fuel to be reformed is small, the required quantity of water is also small and reservoir tank 13 may be compact.

In accordance with a further aspect of any of the foregoing embodiments, reformer 20 preferably uses a water vapor reforming process, which is an endothermic reaction, and thus produces no adverse effect due to heat generation, etc. Further, reformer 20 may be a relatively simple unit, which is especially advantageous when provided with an internal combustion engine of a vehicle. Moreover, when at least some of the heat for the endothermic reaction is provided by burning fuel in the combustion chamber (e.g., auxiliary chamber 27), as shown in the third embodiment, it is unnecessary to provide a separate heat generator because any additional heat that is required for the water vapor reforming process is supplied by the heat from the exhaust gas, and therefore, it is possible to raise the total efficiency of forming the reformed gas.

In accordance with a further aspect of the third embodiment, the combustion heat that is used for heating the mixed fluid may be provided by the reformed gas. That is to say, water and alcohol, i.e., the fluid mixture that is desired to be reformed, may be vaporized in the water vapor reforming process by heat obtained from combusting the reformed gas. It is then possible to condense the water vapor as the vaporized reformed gas is cooled, and it is possible to decrease the volume of the reformed gas and separate unnecessary water.

Also in accordance with a further aspect of the third embodiment, when the fluid mixture flows through the wall of auxiliary chamber 27 (or in a cooling path that may be formed in close proximity to auxiliary chamber 27), it is possible to use the heat obtained from auxiliary chamber 27 as part of the heat for the water vapor reforming and to avoid pre-ignition (i.e., excessively early ignition of the combustion components) in auxiliary chamber 27.

In accordance with a further aspect of the second embodiment, the condenser 23 may provide condensed (i.e., liquefied) water by cooling water vapor in the combustion products exhausted from combustion chamber 5. The condensed water may then be supplied to reservoir tank 13 (e.g., via condensed water pump 25, and condensed water tube 26). Preferably, a majority of the water required in the fuel reforming apparatus may be provided by the condensed water, thereby minimizing the need to supply additional water to reservoir tank 13. Moreover, a more compact reservoir tank 13 may be provided. Since condenser 23 preferably includes a cooling section in a part of the exhaust pipe, it is relatively easy and efficient to cool the exhaust gas in the cooling section and obtain the liquefied condensed water in a recovery section that is also easily arranged in a part of the exhaust pipe.

In accordance with a further aspect of the second embodiment, a filter may provide a means for purifying the condensed water. Preferably, the filter removes impurities from the condensed water, which may then be sent to reservoir tank 13. The filter removes impurities, which may come from internal combustion engine 1, before reaching condenser water tube 26, mixing tank 17, reformer 20, etc.

In accordance with a further aspect of the first embodiment, a relatively large quantity of the reformed gas, relative to the total quantity of both the hydrocarbon based fuel and the reformed fuel that are injected into internal combustion engine 1, may be injected at low engine load, and a relatively small quantity of the reformed gas relative to the total quantity of injected fuel may be injected at high engine load. In general, it is preferable to inject a relatively large quantity of the reformed gas at low engine load, and to inject a relatively small quantity of the reformed gas at high engine load. Thus, it is possible to achieve stable combustion even at low load by supplying a large quantity of the reformed gas, which is well suited for combustion at low engine load conditions in which a small total quantity of fuel is supplied to internal combustion engine 1, and to expand the limit of lean engine operation, etc. On the other hand, at high engine load, only a relatively small quantity of reformed gas is injected to achieve stable combustion, which thereby conserves the reformed gas.

In accordance with a further aspect of the third embodiment, a relatively small quantity of water is supplied when the pressure of the reformed gas in reformed gas accumulation chamber 21 is higher than or equal to a predetermined pressure for a high engine load condition. Thus, it is possible to prevent excessively pressurizing reformed gas accumulation chamber 21 by reducing the quantity of water that is supplied from reservoir tank 13. Since it is unnecessary to supply a large quantity of the reformed gas at high engine load conditions, it is advantageous that the quantity of the reformed gas available in reformed gas accumulation chamber 21 is minimally reduced.

In accordance with a further aspect of any of the foregoing embodiments, a comparatively and/or relatively large quantity of the reformed gas is preferably injected when the exhaust catalyst is not activated during a low temperature start of internal combustion engine 1. Thus, it is possible to rapidly activate the exhaust catalyst by injecting a large quantity of the reformed gas to be combusted, which raises the exhaust gas temperature.

Similarly, in accordance with a further aspect of any of the first to third embodiments, alcohol-containing fuel may be directly supplied to combustion chamber 5 (e.g., a means for supplying fuel may be provided by fuel pump 16, hydrocarbon based fuel tube 18, and main fuel injection valve 11). When pressure of the reformed gas in reformed gas accumulation chamber 21 becomes higher than or equal to a predetermined pressure, the water supply is stopped to stop the separation performed by mixing tank 17, and the alcohol-containing fuel may be directly supplied to combustion chamber 5 for combustion in internal combustion engine 1. Thus, it is possible to prevent excessively pressurizing reformed gas accumulation chamber 21 by stopping the water supply and thereby stopping the separation. Further, it is possible to suppress the consumption of the water required for the separation.

In accordance with a further aspect of any of the foregoing embodiments, the fluid mixture and one of the alcohol-containing fuel or the hydrocarbon based fuel are supplied to combustion chamber 5. Thus, at high engine load conditions, the reforming is stopped, and the fluid mixture and one of the alcohol-containing fuel and hydrocarbon based fuel may be supplied to combustion chamber 5 for combustion in internal combustion engine 1. Since it is unnecessary to use the reformed gas at high engine load conditions, formation of the reformed gas is stopped. At this time, it is possible to prevent an excessively large quantity of the reformed gas from accumulating in reformed gas accumulation chamber 21 by mixing the separated fluid mixture with the alcohol-containing fuel or the hydrocarbon based fuel, and injecting it into combustion chamber 5. Further, since main fuel injection valve 11 for supplying the hydrocarbon based fuel to combustion chamber 5 is common, it is unnecessary to provide another fuel injection valve. Especially, in accordance with a further aspect of the fourth embodiment, the fluid mixture from the mixing tank 17b may mix with one of the alcohol-containing fuel from the fuel tank 15 or the hydrocarbon based fuel from the mixing tank 17a in a mixing portion 171. For example, the mixing portion includes a selector valve. And the selector valve can connect the fluid mixture tube 19 and the hydrocarbon based fuel tube 18 or an alcohol-containing fuel tube from the fuel tank 15. Thus, the fluid mixture from the mixing tank 17b and one of the alcohol-containing fuel or the hydrocarbon based fuel are supplied to the internal combustion engine 1 via the mixing portion 171.

In accordance with a further aspect of the fourth embodiment, fuel cell 33 is provided to generate electricity by providing the reformed gas to fuel cell 33. Thus, it is possible to realize a fuel cell of a gasoline reforming type which has high efficiency and is independent of internal combustion engine 1. The reformed gas, which preferably contains hydrogen, may be provided to each cell of fuel cell 33. Also, in accordance with a further aspect of the fourth embodiment, separator 30 may be provided as a means for separating hydrogen from the reformed gas. Moreover, since operating fuel cell 33 on hydrogen may be achieved by a relatively simple method, with a relatively compact size, etc., internal combustion engine 1 is not affected. Additionally, if the remainder of the gas components, which are obtained after separating hydrogen from the reformed gas, are capable of undergoing oxidation in combustion chamber 5, then it is possible to gain additional energy by combusting the remaining gas components. Carbon monoxide is an example of a remaining gas component that is capable of undergoing oxidation in combustion chamber 5. The electrical energy provided by fuel cell 33 may be supplied to vehicle auxiliary equipment 35. Accordingly, it is possible to avoid complications that may arise by storing excessive quantities of the reformed gas insofar as the reformed gas is provided to fuel cell 33 for generating electric power. Further, it is possible to reduce the size of other electric supply sources, e.g., a battery, for operating vehicle auxiliary equipment 35.

Also in accordance with a further aspect of the fourth embodiment, a vehicle that includes a motor for providing torque to propel a road wheel may be supplied electrical energy obtained from fuel cell 33 to accelerate the vehicle from a standstill. With respect to vehicle fuel efficiency, using the propulsion motor to accelerate during a start condition is advantageous. Further, storing the electric power of the fuel cell may make it unnecessary to store an excessive quantity of the reformed gas.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A heat engine system comprising:
a fuel reforming apparatus including:
  a first reservoir being adapted to store water;
  a second reservoir being adapted to store alcohol-containing fuel, the alcohol-containing fuel including alcohol mixed in a hydrocarbon based fuel that is not alcohol;
  a tank being coupled in fluid communication with the first and second reservoirs, the tank being adapted to:
    mix water received from the first reservoir with alcohol-containing fuel received from the second reservoir so as to form a first supply of a fluid mixture and a second supply of the hydrocarbon based fuel, the fluid mixture including water and alcohol; and
    separate the first supply of the fluid mixture from the second supply of the hydrocarbon based fuel;
  a reaction vessel being coupled in fluid communication with the first supply and being adapted to reform the fluid mixture received from the tank so as to form a reformed gas;
an internal combustion engine being coupled to the fuel reforming apparatus, the internal combustion engine including:
  a combustion chamber;
  a first valve being adapted to provide to the combustion chamber the hydrocarbon based fuel supplied from the tank; and
  a second valve being adapted to provide to the combustion chamber the reformed gas supplied from the reaction vessel; and
an accumulator being in fluid communication between the fuel reforming apparatus and the internal combustion engine, the accumulator being adapted to accumulate and pressurize the reformed gas from the reaction vessel, and the accumulator being adapted to provide the reformed gas to the second valve.

2. The heat engine system according to claim 1, wherein a quantity of water being adapted to be provided by the first reservoir is reduced in response to the reformed gas being pressurized to at least a predetermined pressure in the accumulator as compared to the quantity of water being adapted to be provided by the first reservoir in response to the reformed gas being pressurized to less than the predetermined pressure in the accumulator.

3. The heat engine system according to claim 2, wherein the predetermined pressure corresponds to a high engine load of the internal combustion engine.

4. The heat engine system according to claim 1, wherein the second valve being adapted to provide alcohol-containing fuel to the combustion chamber from the second reservoir in response to the reformed gas being pressurized to at least a predetermined pressure in the accumulator, and the first reservoir being adapted to stop providing water to the tank so as to discontinue separating the first and second supplies.

5. The heat engine system of claim 1, further comprising:
a condenser being in fluid communication between the combustion chamber and the first reservoir, the condenser being adapted to liquefy water vapor in combustion products exhausted from the combustion chamber and to provide the liquefied water vapor to the first reservoir.

6. The heat engine system according to claim 5, further comprising:
a filter being in fluid communication between the condenser and the first reservoir, the filter being adapted to remove impurities from the liquefied water vapor.

7. The heat engine system according to claim 1, wherein a relative quantity of the reformed gas with respect to a total quantity of the reformed gas and the hydrocarbon based fuel adapted to be provided to the internal combustion engine is inversely proportional to engine load of the internal combustion engine.

8. The heat engine system according to claim 1, wherein a quantity of the reformed gas that is adapted to be provided to the internal combustion engine is inversely proportional to engine load of the internal combustion engine.

9. The heat engine system according to claim 1, wherein the second valve being adapted to provide the fluid mixture and one of the alcohol-containing fuel and the hydrocarbon based fuel to the combustion chamber in response to a high engine load of the internal combustion engine and the reforming of the fluid mixture being discontinued.

10. The heat engine system according to claim 1, further comprising:
a combustion chamber being in fluid communication with the fuel reforming apparatus, the combustion chamber being adapted to combust an oxidizable gas other than hydrogen, and the oxidizable gas being adapted to be separated from the reformed gas formed by the fuel reforming apparatus.

11. The heat engine system according to claim 1, further comprising:
a fuel cell being in fluid communication with the fuel reforming apparatus, the fuel cell being adapted to generate electricity in response to being provided the reformed gas formed by the fuel reforming apparatus.

12. The heat engine system according to claim 11, wherein the fuel cell is adapted to generate electricity in response to being provided hydrogen separated from the reformed gas.

13. A heat engine system comprising:
a fuel reforming apparatus including:
    a first reservoir being adapted to store water;
    a second reservoir being adapted to store alcohol-containing fuel, the alcohol-containing fuel including alcohol mixed in a hydrocarbon based fuel that is not alcohol;
    a tank being coupled in fluid communication with the first and second reservoirs, the tank being adapted to:
        mix water received from the first reservoir with alcohol-containing fuel received from the second reservoir so as to form a first supply of a fluid mixture and a second supply of the hydrocarbon based fuel, the fluid mixture including water and alcohol; and
        separate the first supply of the fluid mixture from the second supply of the hydrocarbon based fuel;
a reaction vessel being coupled in fluid communication with the first supply and being adapted to reform the fluid mixture received from the tank so as to form a reformed gas; and
an internal combustion engine being coupled to the fuel reforming apparatus, the internal combustion engine including:
    a combustion chamber;
    a first valve being adapted to provide to the combustion chamber the hydrocarbon based fuel supplied from the tank; and
    a second valve being adapted to provide to the combustion chamber the reformed gas supplied from the reaction vessel;
wherein the combustion chamber comprises a main portion and an auxiliary chamber having a smaller volumetric capacity than the main portion, and the second valve is adapted to provide, to the auxiliary chamber the reformed gas from the reaction vessel.

14. A heat engine system comprising:
a fuel reforming apparatus including:
    a first reservoir being adapted to store water;
    a second reservoir being adapted to store alcohol-containing fuel, the alcohol-containing fuel including alcohol mixed in a hydrocarbon based fuel that is not alcohol;
    a tank being coupled in fluid communication with the first and second reservoirs, the tank being adapted to:
        mix water received from the first reservoir with alcohol-containing fuel received from the second reservoir so as to form a first supply of a fluid mixture and a second supply of the hydrocarbon based fuel, the fluid mixture including water and alcohol; and
        separate the first supply of the fluid mixture from the second supply of the hydrocarbon based fuel;
a reaction vessel being coupled in fluid communication with the first supply and being adapted to reform the fluid mixture received from the tank so as to form a reformed gas;
an internal combustion engine being coupled to the fuel reforming apparatus, the internal combustion engine including:
    a combustion chamber;
    a first valve being adapted to provide to the combustion chamber the hydrocarbon based fuel supplied from the tank; and
    a second valve being adapted to provide to the combustion chamber the reformed gas supplied from the reaction vessel; and
an exhaust catalyst in fluid communication with the internal combustion engine, the exhaust catalyst being adapted to purify combustion products exhausted from the combustion cylinder, wherein a quantity of the reformed gas that is adapted to be provided to the internal combustion engine is increased in response to the exhaust catalyst being not activated relative to the exhaust catalyst being activated.

15. A heat engine system comprising:
a fuel reforming apparatus including:
    a first reservoir being adapted to store water;
    a second reservoir being adapted to store alcohol-containing fuel, the alcohol-containing fuel including alcohol mixed in a hydrocarbon based fuel that is not alcohol;
    a tank being coupled in fluid communication with the first and second reservoirs, the tank being adapted to:
        mix water received from the first reservoir with alcohol-containing fuel received from the second reservoir so as to form a first supply of a fluid mixture and a second supply of the hydrocarbon based fuel, the fluid mixture including water and alcohol; and separate the first supply of the fluid mixture from the second supply of the hydrocarbon based fuel;

a reaction vessel being coupled in fluid communication with the first supply and being adapted to reform the fluid mixture received from the tank so as to form a reformed gas; and an internal combustion engine being coupled to the fuel reforming apparatus, the internal combustion engine including:

a combustion chamber;

a first valve being adapted to provide to the combustion chamber the hydrocarbon based fuel supplied from the tank; and a second valve being adapted to provide to the combustion chamber the reformed gas supplied from the reaction vessel;

wherein the fuel reforming apparatus has a heat generating device to heat the fluid mixture, the heat generating device being a part of the internal combustion engine and further being adapted to generate heat by burning fuel in the combustion chamber;

wherein the reaction vessel uses the heat generated by the heat generating device to form a heated reformed gas by a water vapor reforming process; and wherein the combustion chamber comprises a main portion and an auxiliary chamber having a smaller volumetric capacity than the main portion, the second valve is adapted to provide to the auxiliary chamber the reformed gas from the reaction vessel, and the auxiliary chamber is adapted to provide heat to the fluid mixture.

16. The heat engine system according to claim 15, wherein the fuel burned in the combustion chamber is at least one of the reformed gas and the hydrocarbon based fuel.

17. The heat engine system according to claim 15, wherein the auxiliary chamber is defined by a wall including a cooling passage in fluid communication between the tank and the reaction vessel, and the cooling passage is adapted to provide heat to the fluid mixture flowing through the cooling passage.

* * * * *